United States Patent [19]

Mizuta et al.

[11] Patent Number: 4,853,817
[45] Date of Patent: Aug. 1, 1989

[54] MAGNETIC DISK CARTRIDGE

[75] Inventors: Akira Mizuta; Morio Fujiwara, both of Kanagawa, Japan

[73] Assignee: Fuji Photo Film Co., Ltd., Kanagawa, Japan

[21] Appl. No.: 186,840

[22] Filed: Apr. 27, 1988

[30] Foreign Application Priority Data

Apr. 27, 1987 [JP] Japan .............................. 62-63686[U]

[51] Int. Cl.$^4$ ............................................ G11B 23/033
[52] U.S. Cl. ..................................... 360/133; 369/291
[58] Field of Search ................ 360/133; 206/312, 444; 369/291

[56] References Cited

U.S. PATENT DOCUMENTS 4,589,105  5/1986  Nemoto et al. ...................... 360/133
4,714,973  12/1987  Kato et al. .......................... 360/133
4,785,369  11/1988  Ommori et al. ..................... 360/133

Primary Examiner—Stuart N. Hecker
Assistant Examiner—David J. Severin
Attorney, Agent, or Firm—Sughrue, Mion, Zinn, Macpeak & Seas

[57] ABSTRACT

A magnetic disk cartridge comprises a shell constituted by upper and lower shell halves and having a hole for insertion of a magnetic head, a shutter extending over an edge face of the shell, and a shutter spring provided with bent portions at extremities of two arms. A spring guide is formed on the inner surface of the upper or lower shell half, whichever is positioned on the extremity side of the bent portion of the shutter spring engaged with the shutter, at a hole provided for insertion of the shutter spring. The spring guide has a tapered portion, and extends from the tapered portion at least to the edge of the shutter at its hole closing position. The thickness h from the inner surface of the spring guide at the region overlapping the edge of the shutter at its hole closing position to the outer surface of the shell half provided with the spring guide is not smaller than the internal dimension g of the bent portion of the shutter spring engaged with the shutter.

4 Claims, 5 Drawing Sheets

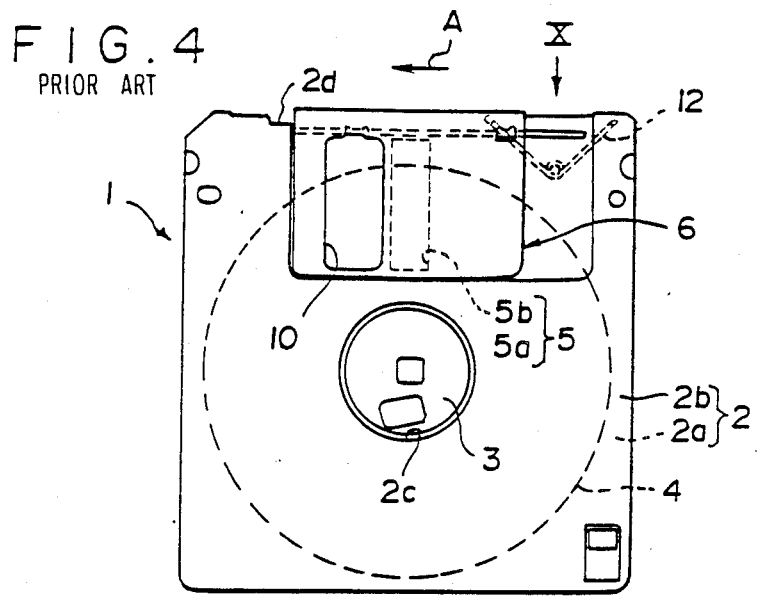
FIG. 4 PRIOR ART
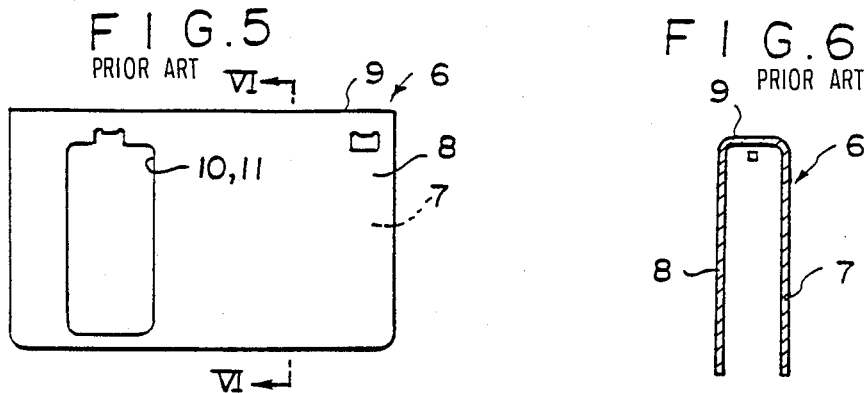
FIG. 5 PRIOR ART
FIG. 6 PRIOR ART
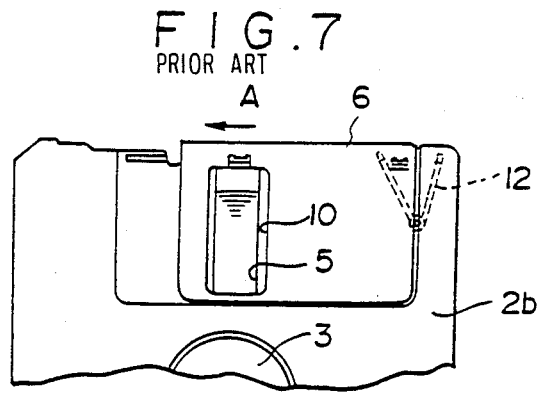
FIG. 7 PRIOR ART

MAGNETIC DISK CARTRIDGE

BACKGROUND OF THE INVENTION

1. Field of the Invention

This invention relates to a magnetic disk cartridge provided with a magnetic disk, a shell for housing the magnetic disk therein, and a shutter for opening and closing a hole formed in the shell for insertion of a magnetic head. This invention particularly relates to a hole provided for insertion of a shutter spring for urging the shutter to the position that closes the hole for insertion of a magnetic head.

2. Description of the Prior Art

There have heretofore been known magnetic disk cartridges provided with a magnetic disk, a shell for housing the magnetic disk therein, and a shutter having a U-shaped cross section and slideably fitted to the shell for opening and closing a hole formed in the shell for insertion of a magnetic head.

FIG. 4 is a bottom view showing an example of the conventional magnetic disk cartridge. With reference to FIG. 4, a conventional magnetic disk cartridge 1 comprises a thin box-like shell 2 composed of an upper shell half 2a and a lower shell half 2b which have approximately symmetrical shapes and are joined together. A magnetic disk 4 provided with a metal center core 3 at the center is housed in the shell 2, and the center core 3 is exposed to the exterior via a circular center hole 2c formed in the shell 2. In the course of recording and reproduction of information, the magnetic disk cartridge 1 is fed into a magnetic disk drive device for recording and reproduction, the center core 3 is magnetically chucked to a spindle in the drive device, and the magnetic disk 4 is rotated in the shell 2 by the spindle.

Recording of the information on the magnetic disk 4 or reproduction of information therefrom is carried out by the contact of the magnetic head, which is provided in the drive device, with the rotating magnetic disk 4. Therefore, a rectangular hole 5b for insertion of the magnetic head into the lower shell half 2b is formed in the lower shell half 2b in the radial direction of the magnetic disk 4, and a hole 5a for insertion of the magnetic head or a pad into the upper shell half 2a is formed in the same shape as the shape of the hole 5b at the position of the upper shell half 2a that corresponds to the position of the hole 5b.

The hole 5a for insertion of the magnetic head or the pad and the hole 5b for insertion of the magnetic head (both will hereinafter be simply referred to as the hole 5 provided for insertion of the magnetic head) are closed for prevention of dust entry and protection of the magnetic disk 4 as long s the magnetic head is not to be inserted into the hole 5 provided for insertion of the magnetic head. Only in the course of recording and reproduction, the hole 5 provided for insertion of the magnetic head is opened to expose the magnetic disk 4 to the exterior. FIG. 5 is a bottom view showing the shutter in FIG. 4, and FIG. 6 is a sectional view taken along line VI-VI of FIG. 5. Specifically, the hole 5 provided for insertion of the magnetic head is covered by a shutter 6 as shown in FIGS. 5 and 6. The shutter 6 is composed of an upper plate 7, a lower plate 8, and a connection plate 9 for connecting the upper plate 7 and the lower plate 8 with each other. The lower plate 8 is provided with an opening 10 having a shape nearly equal to or slightly larger than the shape of the hole 5 provided for insertion of the magnetic head. Also, The upper plate 7 is provided with a opening 11 similar to the opening 10 at the position corresponding to the opening 10. The shutter 6 is fitted to the shell 2 over a front edge face 2d thereof so that the shutter 6 is slideable between a hole closing position at which the upper plate 7 and the lower plate 8 close the hole 5 provided for insertion of the magnetic head as shown in FIG. 4 and a hole opening position at which the openings 10 and 11 align with the hole 5 provided for insertion of the magnetic head as shown in FIG. 7. Also, the shutter 6 is urged by a shutter spring 12 toward the hole closing position in the direction as indicated by the arrow A. In general, a torsion coil spring is used as the shutter spring 12. FIG. 8 is a bottom view showing the shutter spring 12 shown in FIG. 4, and FIG. 9 is a front view showing the shutter spring 12 shown in FIG. 4. The shutter spring 12 is made by coiling a stainless steel wire several turns. A left arm 14 and a right arm 15 extend linearly from both ends of a coiled portion 13. A bent portion 14a is formed downward at the extremity of the left arm 14 at an angle approximately normal to the left arm 14, and a bent portion 15a is formed upward at the extremity of the right arm 15 at an angle approximately normal to the right arm 15 (the upward-downward direction coincides with the height direction of the coiled portion 13). Also, the lengths of the left arm 14 and the right arm 15 are equal to each other, and the lengths of the bent portion 14a and the bent portion 15a are equal to each other. Thus the left arm 14 and the bent portion 14a are symmetrical with the right arm 15 and the bent portion 15a with respect to a point.

As shown in FIG. 4, the shutter spring 12 is provided at the rear position as viewed in the urging direction for the shutter 6 as indicated by the arrow A, and urges the shutter 6 to the position that closes the hole 5 provided for insertion of the magnetic head by the resilient urging force of the arms 14 and 15. Also, at the time the hole 5 provided for insertion of the magnetic head is to be opened, the shutter 6 is moved to the hole opening position as shown in FIG. 7 against the resilient urging force of the arms 14 and 15.

FIG. 10 is a front view showing the major part of the magnetic disk cartridge as viewed from the direction as indicated by the arrow X in FIG. 4, FIG. 11 is a bottom view showing the major part of the magnetic disk cartridge as viewed from the direction as indicated by the arrow XI in FIG. 10, FIG. 12 is a sectional view taken along line XII—XII of FIG. 11, and FIG. 13 is a sectional view taken along line XIII-XIII of FIG. 11. The shutter spring 12 is provided in the condition as shown in FIGS. 10, 11, 12 and 13.

Specifically, the bent portion 15a of the right arm 15 of the shutter spring 12 is inserted into and held in a recess 16 formed on the inner side of the upper shell half 2a. The bent portion 14a of the left arm 14 is engaged with a hook-like engagement portion 9a formed by bending a part of the connection plate 9 of the shutter 6 inwardly. As shown in FIG. 12, the recess 16 is surrounded by a front wall 2a' of the upper shell half 2a, a front wall 2b' of the lower shell half 2b, and an overhang 18 formed on the upper shell half 2a. Therefore, the bent portion 15a inserted into the recess 16 does not fall in the vertical and horizontal directions in FIG. 12, and is secured in the recess 16 by being pushed by the resilience of the shutter spring 12 itself against the edge face of the recess 16 on the side opposite to the shutter 6.

The bent portion 14a of the left arm 14 is engaged with the hook-like engagement portion 9a, and is prevented from disengagement from the engagement portion 9a by the combination of the engagement portion 9a, the connection plate 9 of the shutter 6, with the upper shell half 2a.

FIG. 14 is a schematic view showing the method of fitting the shutter spring 12 into the shell 2. With reference to FIG. 14, in the course of the manufacturing process, the shutter spring 12 is fitted into the shell 2 by bending the left arm 14 and the right arm 15 so that the shutter spring 12 can be inserted into a hole 17 which is provided for insertion of the shutter spring and which is opened at the front edge face 2d of the shell 2 at the time the shutter 6 is present at the hole closing position as shown in FIG. 14, and inserting the coiled portion 13 and then the arms 14 and 15 into the predetermined position inside of the shell 2 by use of a pusher 19. Such a method of fitting the shutter spring 12 into the shell 2 by use of an automatic machine is preferable from the viewpoint of simplification of the manufacturing process. As shown in FIGS. 10 and 11, in order to facilitate the fitting of the shutter spring 12, a step-like portion 21a provided with a rearward front edge face 21 positioned rearward from a main front edge face 20 of the upper shell half 2a as viewed in the direction as indicated by the arrow D in FIG. 11 is formed at the front edge region of the upper shell half 2a at the position corresponding to the hole 17 provided for insertion of the shutter spring 12. The step-like portion 21a continues to the aforesaid overhang 18. Also, a step-like portion 24a provided with a rearward front edge face 24 positioned rearward from a main front edge face 23 which is positioned at the same forward position as the main front edge face 20 of the upper shell half 2a is formed at the front edge region of the lower shell half 2b at the position corresponding to the hole 17 provided for insertion of the shutter spring 12.

In the case where the shutter spring 12 is inserted into the shell 2 by the method as mentioned above, the bent portion 15a of the right arm 15 is guided by the step-like portion 21a and the overhang 18, and is reliably held in the recess 16. However, as shown in FIG. 15, at the time the shutter spring 12 is inserted into the shell 2, there is the risk of the shutter spring 12 being deviated toward the lower plate 8 of the shutter 6, so that the extremity of the bent portion 14a of the left arm 14 interferes with the right edge face of the lower plate 8 and insertion of the bent portion 14a into the predetermined position becomes impossible. Therefore, special devices and accurate adjustments with respect to molds for the upper shell half 2a and the lower shell half 2b have heretofore been required in the procedure for fitting the shutter spring 12 by use of the automatic machine. To eliminate this problem, it may be considered to, for example, divide the process of insertion of the shutter spring 12 into two steps, insert a part of the shutter spring 12 or the extremity of the bent portion in the first step, and insert the remainder in the second step. However, this method has various problems such that the manufacturing process becomes complicated, and the equipment cost becomes high.

SUMMARY OF THE INVENTION

The primary object of the present invention is to provide a magnetic disk cartridge wherein fitting of a shutter spring is carried out reliably by a simple and rational method in the course of fitting of the shutter spring by use of an automatic machine.

Another object of the present invention is to provide a magnetic disk cartridge wherein fitting of a shutter spring is carried out efficiently in the course of fitting of the shutter spring by use of an automatic machine.

The present invention provides a magnetic disk cartridge provided with:

(i) a shell constituted by a magnetic disk, an upper shell half and a lower shell half, provided with a hole for insertion of a magnetic head, and housing said magnetic disk therein, (ii) a shutter fitted to extend over an edge face of said shell for sliding movement between a hole closing position at which said shutter closes said hole provided for insertion of the magnetic head and a hole opening position at which said shutter opens said hole provided for insertion of the magnetic head, and (iii) a shutter spring provided with bent portions, each of which is formed at an extremity of each of two arms and is bent vertically at an angle approximately normal to each of said arms, and inserted into said shell from a hole, which is provided for insertion of said shutter spring and is opened at said edge face of said shell, with said shutter being positioned at said hole closing position, so that one of said bent portions is engaged with an engagement means formed in said shell and the other of said bent portions is engaged with an engagement means formed on said shutter, whereby said shutter spring urges said shutter to said hole closing position, wherein the improvement comprises:

(a) a spring guide on the inner surface of said upper shell half or said lower shell half, whichever is positioned on the extremity side of said bent portion of said shutter spring on the side engaged with said shutter, at the position corresponding to said hole provided for insertion of said shutter spring, said spring guide being provided with a tapered portion which enters the inside of said shell toward said shutter, and extending from said tapered portion at least to the edge of said shutter, which is present at said hole closing position, on the side of said hole provided for insertion of said shutter spring, and (b) the thickness h from the inner surface of said spring guide at the region overlapping said edge of said shutter, which is present at said hole closing position, on the side of said hole provided for insertion of said shutter spring to the outer surface of said shell half provided with said spring guide being not smaller than the internal dimension g of said bent portion of said shutter spring on the side engaged with said shutter.

With the magnetic disk cartridge in accordance with the present invention wherein the spring guide provided with the tapered portion entering the inside of the shell toward the shutter side is formed on the inner surface of the shell at the position corresponding to the hole provided for insertion of the shutter spring, the shutter spring is guided by the spring guide, so that the extremity of the bent portion enters inward from the connection plate of the shutter without interfering with the edge of the shutter, and is reliably engaged with the engagement means of the shutter. Therefore, even if the automatic machine is used, the operation for the fitting of the shutter spring can be carried out reliably and efficiently, and the magnetic disk cartridge in accordance with the present invention is advantageous from the operation efficiency and the manufacturing process. Also, no fine adjustment is required for the apparatus for fitting the shutter spring in accordance with differences in the courses of manufacture of the upper shell half and the lower shell half, and the fitting of the shutter springs to the shells of the same type can be carried out smoothly by use of the same fitting apparatus. This also contributes to the improvement of the efficiency of operation.

BRIEF DESCRIPTION OF THE DRAWINGS

FIG. 4 is a bottom view showing an example of the conventional magnetic disk cartridge, FIG. 5 is a bottom view showing the shutter shown in FIG. 4, FIG. 6 is a sectional view taken along line VI—VI of FIG. 5, FIG. 7 is a bottom view showing the major part of the conventional magnetic disk cartridge shown in FIG. 4 with the shutter at the hole opening position.

DESCRIPTION OF THE PREFERRED EMBODIMENTS

The present invention will hereinbelow be described in further detail with reference to the accompanying drawings.

Figure 1:
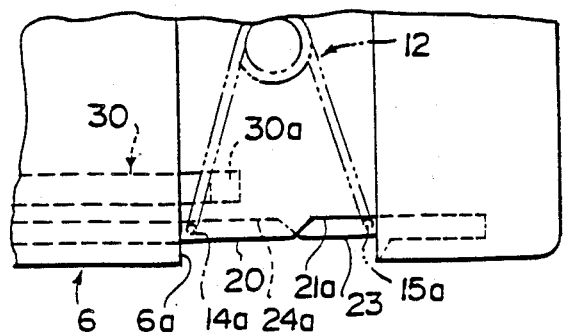
FIG. 1 is a plan view showing the region of a hole provided for insertion of a shutter spring in an embodiment of the magnetic disk cartridge in accordance with the present invention.
Figure 2:
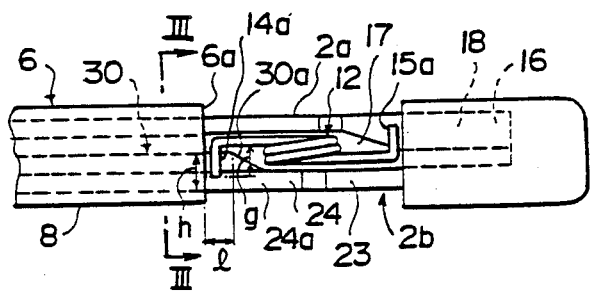
FIG. 2 is a front view showing the region of the hole provided for insertion of a shutter spring in the embodiment shown in FIG. 1.
Figure 3:
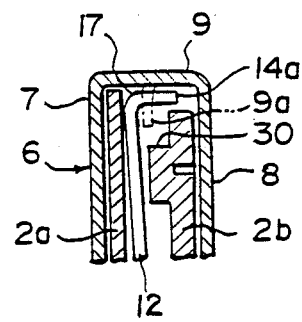
FIG. 3 is a sectional view taken along line III—III of FIG. 2.
Figure 8:
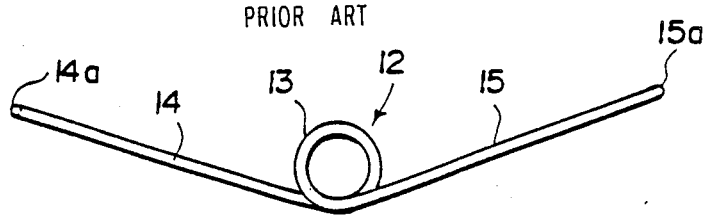
FIG. 8 is a bottom view of the shutter spring shown in FIG. 4.
Figure 9:
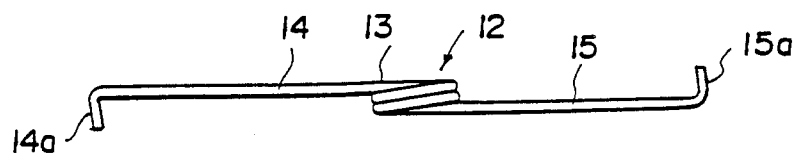
FIG. 9 is a front view showing the shutter spring shown in FIG. 4.

With reference to FIGS. 1, 2 and 3, an embodiment of the magnetic disk cartridge in accordance with the present invention is similar to the magnetic disk cartridge shown in FIGS. 4 to 15, except for the configuration at the hole provided in a shell for insertion of a shutter spring. In FIGS. 1, 2 and 3, similar elements are numbered with the same reference numerals with respect to FIGS. 4 to 15.

Specifically, as in the case of the magnetic disk cartridge 1 shown in FIG. 4, the magnetic disk cartridge 1 in accordance with the present invention comprises the shell composed of the upper shell half 2a and the lower shell half 2b joined together, the magnetic disk 4 housed in the shell 2, and the shutter 6 for opening and closing the hole 5 through which the magnetic head is to be inserted to contact with the magnetic disk 4. The shutter 6 is fitted to extend over an edge face of the shell 2, and is urged by the shutter spring 12 of the same type as in the conventional magnetic disk cartridge in the direction that closed the hole 5 provided for insertion of the magnetic head.

Figure 12:
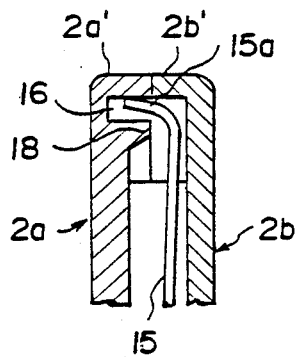
FIG. 12 is a sectional view taken along line XII—XII of FIG. 11.
Figure 13:
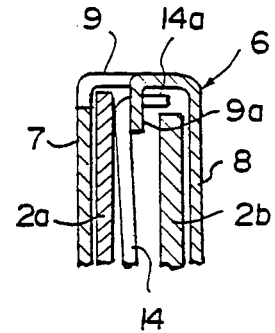
FIG. 13 is a sectional view taken along line XIII—XIII of FIG. 11.

Engagement of the shutter spring 12 is effected in the same manner as in the conventional magnetic disk cartridge as shown in FIGS. 12 and 13. Specifically, the bent portion 15a of the right arm 15 of the shutter spring 12 is held in the recess 16 as an engagement means formed in the shell 2, and the bent portion 14a of the left arm 14 is engaged with the hook-like engagement portion 9a formed on the shutter 6. Fitting of the shutter spring 12 is carried out by use of an automatic machine.

In order to achieve reliable fitting of the shutter spring 12 by use of the automatic machine, as shown in FIG. 1 and FIG. 2 showing the step of insertion of the shutter spring 12, the magnetic disk cartridge 1 in accordance with the present invention is provided with a spring guide 30 formed on the inner surface of the lower shell half 2b, which is present on the extremity side of the bent portion 14a of the shutter spring 12 on the side engaged with the shutter 6, at the position corresponding to the hole 17 provided for insertion of the shutter spring 12. Specifically, the spring guide 30 is formed on the inner surface of the step-like portion 24a provided with the rearward front edge face 24 which is positioned rearward from the main front edge face 23. The spring guide 30 is provided with a tapered portion 30a entering the inside of the shell 2 toward the shutter 6, and extends from the tapered portion 30a at least to an edge 6a of the shutter 6, which is disposed at the hole closing position, on the side of the hole 17 provided for insertion of the shutter spring. 12. Also, the thickness h of the lower shell half 2b at the region overlapping the edge 6a of the shutter 6, which is disposed at the hole closing position, on the side of the hole 17 provided for insertion of the shutter spring 12, i.e., the thickness h from the inner surface of the spring guide 30 to the outer surface of the lower shell half 2b, is adjusted to be not smaller than the internal dimension g of the bent portion 14a of the shutter spring 12. The protrusion length ( of the part of the spring guide 30, that is outside of the tapered portion 30a, from the edge 6a of the shutter 6 should preferably be within the range of 1.0 mm to 5.0 mm, and is adjusted to be l=1.5 mm in this embodiment. Also, the thickness h is adjusted to be h=1.45 mm, and the internal dimension g is adjusted to be g≦1.45 mm.

The upper shell half 2a has the same shape as in the conventional magnetic disk cartridge.

Figure 10:
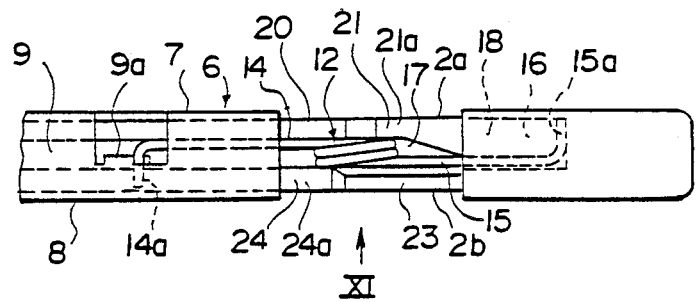
FIG. 10 is an enlarged front view showing the major part of the conventional magnetic disk cartridge shown in FIG. 4.
Figure 11:
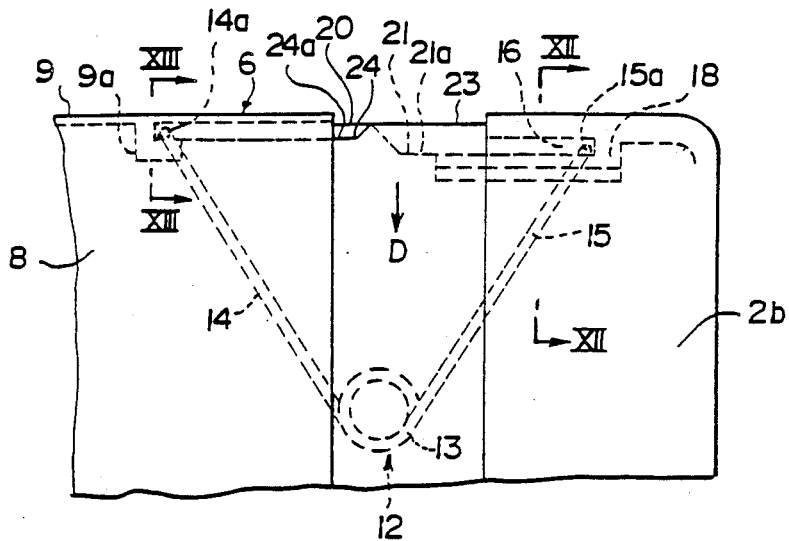
FIG. 11 is an enlarged bottom view showing the conventional magnetic disk cartridge shown in FIG. 4.
Figure 14:
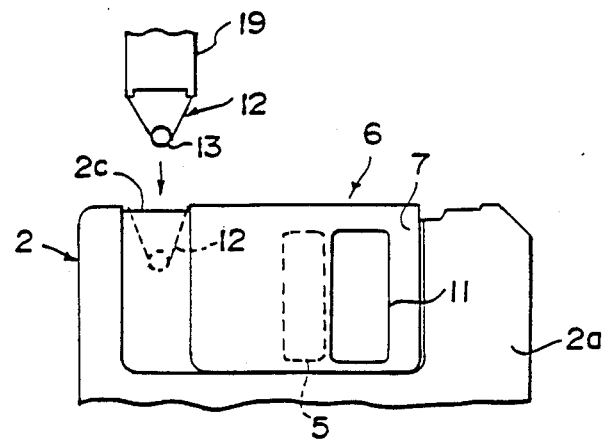
FIG. 14 is a schematic view showing the method of fitting the shutter spring.
Figure 15:
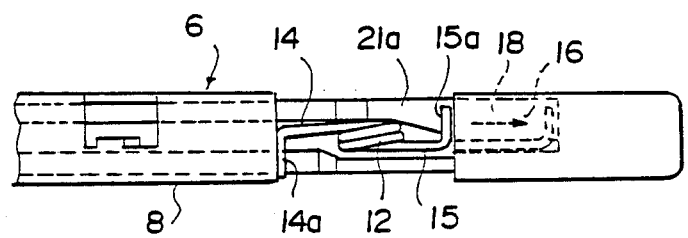
FIG. 15 is an enlarged front view showing the problems of the conventional magnetic disk cartridge.

In the present invention, the configuration of the lower shell half 2b at the region corresponding to the hole 17 provided for insertion of the shutter spring 12 is improved in the manner as mentioned above. Therefore, in the case where the insertion of the shutter spring 12 into the shell 2 is carried out by the method as shown in FIG. 14, the bent portions 14a and 15a at both ends of the shutter spring 12 are grasped by the pusher 19, the shutter spring 12 is inserted into the space between the upper shell half 2a and the lower shell half 2b, and the bent portions 14a and 15a are positioned on the step-like portions 24a and 21a. At this time, the shutter spring 12 expands by its resilience, and the bent portion 14a of the left arm 14 is guided by the spring guide 30 and is engaged with the engagement portion 9a of the shutter 6 as shown in FIG. 10 without interfering with the right edge of the lower plate 8 of the shutter 6.

I claim:

1. A magnetic disk cartridge provided with:
   (i) a shell constituted by a magnetic disk, an upper shell half and a lower shell half, provided with a hole for insertion of a magnetic head, and housing said magnetic disk therein,
   (ii) a shutter fitted to extend over an edge face of said shell for sliding movement between a hole closing position at which said shutter closes said hole provided for insertion of the magnetic head and a hole opening position at which said shutter opens said hole provided for insertion of the magnetic head, and
   (iii) a shutter spring provided with bent portions, each of which is formed at an extremity of each of two arms and is bent vertically at an angle approximately normal to each of said arms, and inserted into said shell from a hole, which is provided for insertion of said shutter spring and is opened at said edge face of said shell, with said shutter being positioned at said hole closing position, so that one of said bent portions is engaged with an engagement means formed in said shell and the other of said bent portions is engaged with an engagement means formed on said shutter, whereby said shutter spring urges said shutter to said hole closing position, wherein the improvement comprises:
   (a) a spring guide on the inner surface of said upper shell half or said lower shell half, whichever is positioned on the extremity side of said bent portion of said shutter spring on the side engaged with said shutter, at the position corresponding to said hole provided for insertion of said shutter spring, said spring guide being provided with a tapered portion which enters the inside of said shell toward said shutter, and extending from said tapered portion at least to the edge of said shutter, which is present at said hole closing position, on the side of said hole provided for insertion of said shutter spring, and
   (b) the thickness h from the inner surface of said spring guide at the region overlapping said edge of said shutter, which is present at said hole closing position, on the side of said hole provided for insertion of said shutter spring to the outer surface of said shell half provided with said spring guide being not smaller than the internal dimension g of said bent portion of said shutter spring on the side engaged with said shutter.

2. A magnetic disk cartridge as defined in claim 1 wherein the protrusion length ( of the part of said spring guide, that is outside of said tapered portion, from said edge of said shutter, which is present at said hole closing position, on the side of said hole provided for insertion of said shutter spring, is within the range of 1.0 mm to 5.0 mm.

3. A magnetic disk cartridge as defined in claim 2 wherein said protrusion length l is l=1.5 mm.

4. A magnetic disk cartridge as defined in claim 1, 2 or 3 wherein said thickness h is h=1.45 mm, and said internal dimension g is g≦1.45 mm.

* * * * *